(12) United States Patent
Kim

(10) Patent No.: US 8,281,904 B2
(45) Date of Patent: Oct. 9, 2012

(54) DISK BRAKE FOR VEHICLES

(75) Inventor: Joo Gon Kim, Deajeon (KR)

(73) Assignee: Mando Corporation, Gyeonggi-Do (KR)

( * ) Notice: Subject to any disclaimer, the term of this patent is extended or adjusted under 35 U.S.C. 154(b) by 822 days.

(21) Appl. No.: 12/133,856

(22) Filed: Jun. 5, 2008

(65) Prior Publication Data
US 2009/0127034 A1      May 21, 2009

(30) Foreign Application Priority Data

Nov. 15, 2007  (KR) .................... 10-2007-0116368

(51) Int. Cl.
    *F16D 55/02*    (2006.01)
    *F16D 55/08*    (2006.01)
(52) U.S. Cl. ................ 188/71.8; 188/72.7; 188/72.8
(58) Field of Classification Search ............... 188/70 R, 188/71.1, 71.7, 71.8, 71.9, 72.2, 72.7, 72.8, 188/196 B
    See application file for complete search history.

(56) References Cited

U.S. PATENT DOCUMENTS

| | | | | |
|---|---|---|---|---|
| 3,292,740 A | * | 12/1966 | Swift | 188/71.9 |
| 3,547,229 A | * | 12/1970 | Pollinger et al. | 188/59 |
| 4,553,643 A | * | 11/1985 | Wilcox | 188/71.9 |
| 2004/0011603 A1 | * | 1/2004 | Yokoyama et al. | 188/72.7 |
| 2004/0262101 A1 | * | 12/2004 | Baumann et al. | 188/79.51 |
| 2005/0077782 A1 | * | 4/2005 | Horiuchi et al. | 303/20 |
| 2005/0167212 A1 | * | 8/2005 | Pascucci et al. | 188/72.2 |
| 2006/0151262 A1 | * | 7/2006 | Baumgartner et al. | 188/72.9 |
| 2008/0289913 A1 | * | 11/2008 | Baumann | 188/72.2 |
| 2008/0314695 A1 | * | 12/2008 | Kim | 188/72.7 |

FOREIGN PATENT DOCUMENTS

| | | |
|---|---|---|
| DE | 2334091 A | 1/1974 |
| DE | 2334458 A1 | 1/1974 |
| DE | 10347942 A1 | 5/2005 |
| DE | 102006014250 A1 * | 10/2007 |

* cited by examiner

*Primary Examiner* — Robert A Siconolfi
*Assistant Examiner* — Anna Momper
(74) *Attorney, Agent, or Firm* — McDermott Will & Emery LLP

(57) ABSTRACT

Disclosed herein is a disk brake for vehicles including a gap adjuster to compensate for a gap between a frictional pad and a disk based upon the wear of the frictional pad. The disk brake includes a disk rotatable along with each wheel of a vehicle, a movable frictional pad configured to press against one side of the disk to generate a braking force, a wedge member having the movable frictional pad attached to one side thereof, the wedge member being movable to the rotation direction of the disk by a drive motor to generate a power such that the wedge member advances to the disk, and a guide member to guide the wedge member such that the wedge member advances to the disk. The disk brake further includes a gap adjuster to uniformly maintain a gap between the movable frictional pad and the disk.

3 Claims, 3 Drawing Sheets

DISK BRAKE FOR VEHICLES

CROSS-REFERENCE TO RELATED APPLICATION

This application claims the benefit of Korean Patent Application No. 2007-0116368, filed on Nov. 15, 2007 in the Korean Intellectual Property Office, the disclosure of which is incorporated herein by reference.

BACKGROUND OF THE INVENTION

1. Field of the Invention

The present invention relates to a disk brake for vehicles, and, more particularly, to a disk brake for vehicles including a gap adjuster to compensate for a gap between a frictional pad and a disk based upon the wear of the frictional pad.

2. Description of the Related Art

Generally, a disk brake for vehicles is an apparatus that obtains a braking force by partially pressing frictional pads against opposite sides of a disk rotatable along with each wheel of a vehicle. An example of the disk brake includes a disk rotatable along with each wheel of a vehicle, a frictional pad configured to press against one side of the disk to generate a braking force, a wedge member having the frictional pad attached to one side thereof, the wedge member being movable to the rotation direction of the disk by a drive motor to generate a power such that the wedge member advances to the disk, and a guide member to guide the wedge member, such that the wedge member advances to the disk, when the wedge member moves to the rotation direction of the disk, the wedge member being fitted between the disk and the guide member, whereby it is possible to obtain a relatively large braking force using a relatively small power.

The conventional disk brake for vehicles further includes a power transmission unit movable to the rotation direction of the disk by the drive motor to move the wedge member to the rotation direction of the disk.

For the power transmission unit to move to the rotation direction of the disk, as described above, a male screw is formed on a rotary shaft of the drive motor, and the power transmission unit is provided with a shaft installation hole having a female screw is formed on the inner circumference thereof. Consequently, the power transmission unit can advance to or retreat from the rotation direction of the disk according to the rotation direction of the rotary shaft.

The conventional disk brake for vehicles needs a booster to perform speed reduction, displacement reduction, and boosting functions to implement a braking operation using the rotating force of the drive motor. An example of the booster includes a pair of wedge members having inclined surfaces corresponding thereto.

However, the frictional pad gradually wears due to continuous friction between the frictional pad and the disk. As a result, a gap between the frictional pad and the disk gradually increases. If the gap is not compensated for, a braking force and braking responsibility gradually reduce with the progress of the wear of the frictional pad.

SUMMARY OF THE INVENTION

Therefore, it is an aspect of the invention to provide a disk brake for vehicle that is capable of adjusting a gap between a frictional pad and a disk due to the progress of the wear of the frictional pad.

In accordance with one aspect, the present invention provides a disk brake for vehicles, including a disk rotatable along with each wheel of a vehicle, a movable frictional pad configured to press against one side of the disk to generate a braking force, a wedge member having the movable frictional pad attached to one side thereof, the wedge member being movable to the rotation direction of the disk by a drive motor to generate a power such that the wedge member advances to the disk, and a guide member to guide the wedge member such that the wedge member advances to the disk, wherein the disk brake further includes a gap adjuster to uniformly maintain a gap between the movable frictional pad and the disk.

Preferably, the gap adjuster includes a sensing unit to sense the advance of the wedge member by more than a predetermined distance from the guide member, at the time of braking, due to the wear of the movable frictional pad, and a moving unit to move the guide member to the disk based on the sensing result of the sensing unit.

Preferably, the sensing unit includes a push rod configured to be pushed by the wedge member such that the push rod performs a rectilinear movement, and the moving unit includes a gear configured to rotate while engaging with one end of the push rod, a screwed connection shaft connected to the gear, and a nut fitted on the screw of the connection shaft to perform an advance and retreat movement.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
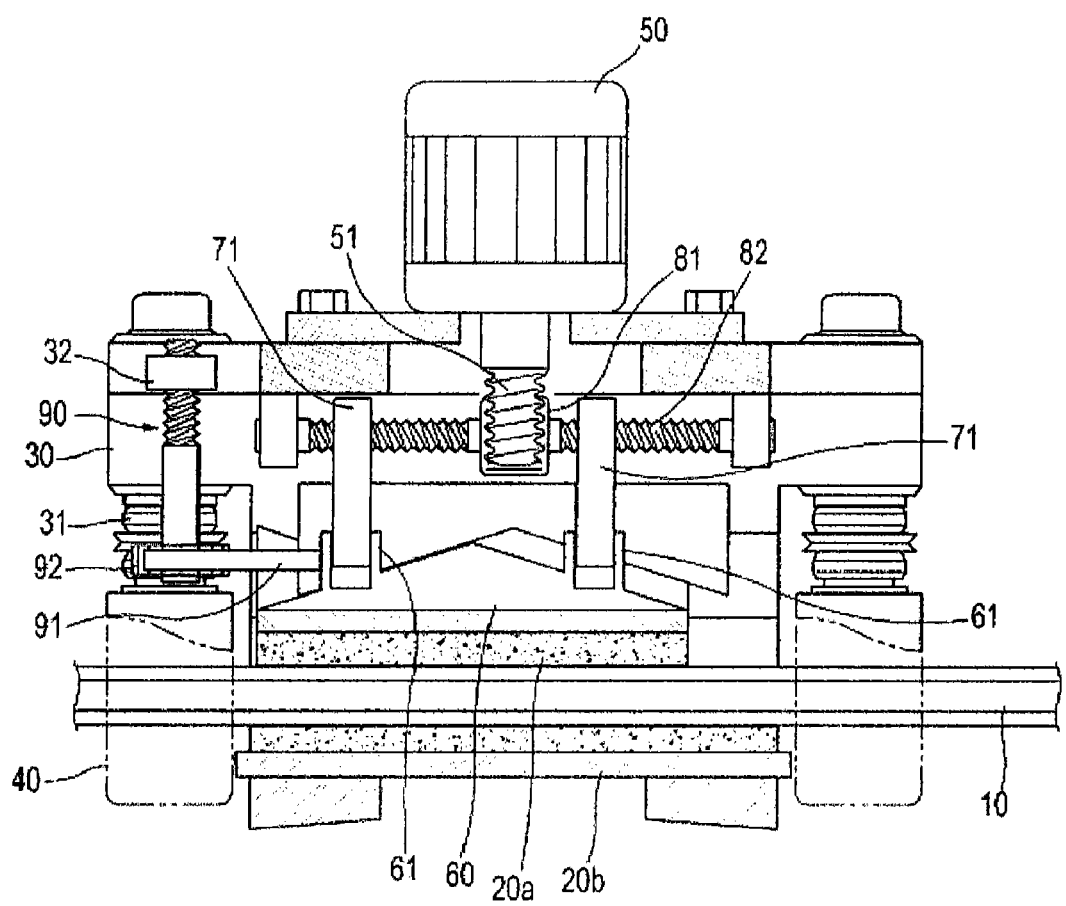
FIG. 1 is an exploded perspective view illustrating a disk brake for vehicles according to the present invention.

Reference will now be made in detail to the embodiment of the present invention, examples of which are illustrated in the accompanying drawings, wherein like reference numerals refer to like elements throughout. The embodiment is described below to explain the present invention by referring to the figures.

Figure 2:
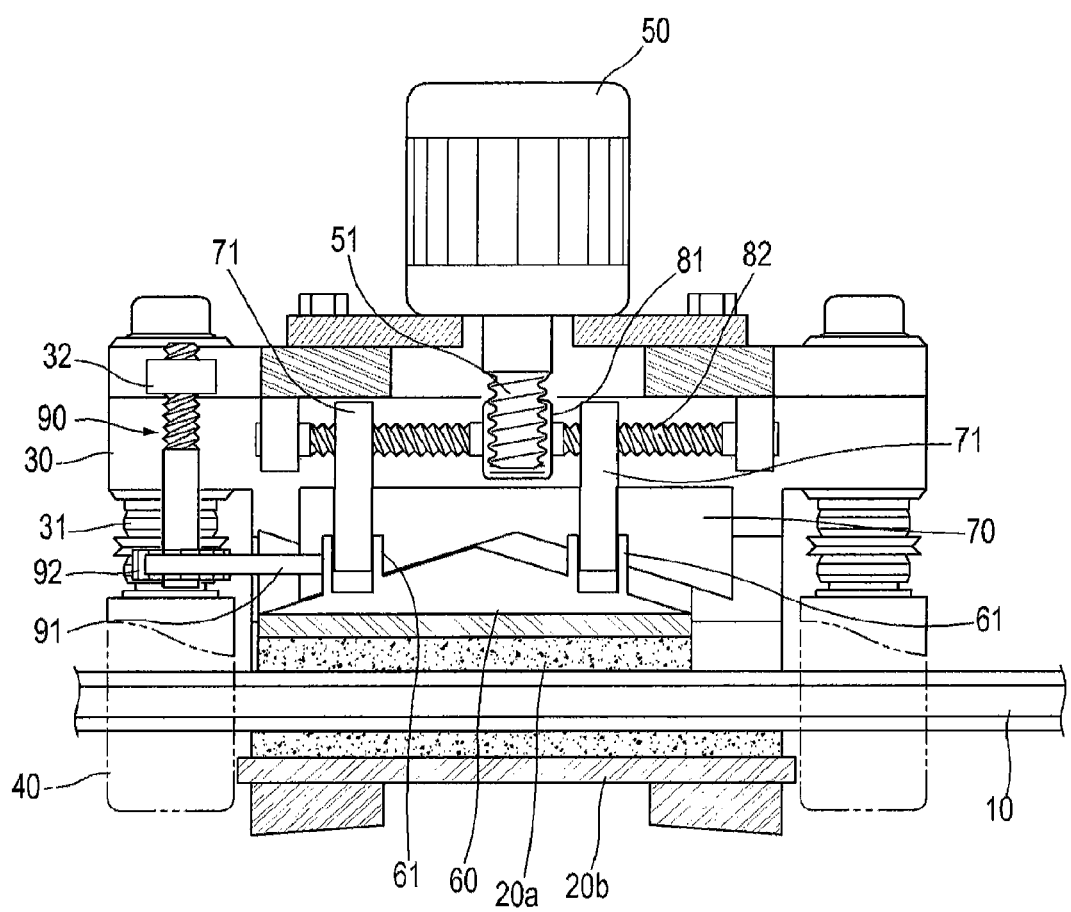
FIG. 2 is a schematic view of the disk brake for vehicles according to the present invention.

As shown in FIGS. 1 and 2, a disk brake for vehicles according to the present invention is an apparatus that obtains a braking force by pressing frictional pads 20a and 20b against opposite sides of a disk 10 rotatable along with each wheel (not shown) of a vehicle. The disk brake includes a caliper housing 30 having a pair of frictional pads 20a and 20b disposed therein at opposite sides thereof such that the frictional pads 20a and 20b are opposite to each other and a carrier 40 fixed to a knuckle (not shown) of the vehicle to allow the caliper housing 30 to be mounted at the knuckle such that the caliper housing 30 advances to and retreats from the knuckle.

For the caliper housing 30 to be mounted at the carrier 40 such that the caliper housing 30 advances to and retreats from the carrier 40, a pair of guide rods 31, which are mounted at the carrier 40 such that the guide rods 31 advance to and retreat from the carrier 40, are fixed to the caliper housing 30 at opposite sides thereof by coupling members such as screws.

In the caliper housing 30 at one side thereof are disposed a wedge member 60, at the front, facing the disk 10, of which the frictional pad 20a is mounted, and a guide member 70, the front of which is disposed in direct or indirect contact with the rear of the wedge member 60, to perform a rectilinear movement, when a power from a drive motor 50 is transmitted to the guide member 70, to guide the wedge member 60 such that the wedge member 60 advances to the disk 10.

In the caliper housing 30 at the other side thereof is disposed a finger unit (not shown) at which the frictional pad 20b is mounted. In this embodiment, the frictional pad 20a, which is mounted at the wedge member 60 such that the frictional pad 20a moves along with the wedge member 60, is referred to as a movable frictional pad, and the frictional pad 20b, which is opposite to the frictional pad 20a, is referred to as a stationary frictional pad for convenience of description.

The front of the wedge member 60 is disposed in parallel to one side of the disk 10 such that the movable frictional pad 20a wholly comes into uniform contact with the one side of the disk 10. The rear of the wedge member 60 is inclined at a predetermined angle to the disk 10 such that at least one side end of the wedge member 60 located at the rotation direction of the disk 10 is formed in the shape of a wedge.

The guide member 70 is formed, such that the front of the guide member 70 corresponds to the rear of the wedge member 60, to guide the advance of the wedge member 60 to the disk 10 when the wedge member 60 moves to the rotation direction of the disk 10.

Also, a power converter to convert a rotary movement of the drive motor 50 into a rectilinear movement of the wedge member 60 is mounted between the guide member 70 and the drive motor 50.

The power converter includes a worm 51 axially connected to a rotary shaft of the drive motor 50, a worm wheel 81 configured to be driven according to the rotation of the worm 51, a screwed spindle extending through the center of the worm wheel 81 such that the spindle is rotated upon the rotation of the worm wheel 81, and transfer members 71 connected to the wedge member 60 to perform a rectilinear movement along the screw of the spindle 82 in the axial direction of the spindle 82.

The transfer members 71 may be implemented by nuts or ball screws which move rectilinearly upon the rotation of the spindle 82. At this time, the transfer members 71 and the wedge member 60 are slidably coupled to each other such that a slant movement of the wedge member 60 is guaranteed when the transfer members 71 move in the rotation direction of the disk 10. Consequently, the wedge member 60 is provided with guides 61 to guide a forward-and-backward rectilinear slide movement in the direction of the disk 10 between the transfer members 71 and the wedge member 60. In the guides 61 are mounted the corresponding transfer members 71.

Consequently, when a power generated by the rotation of the drive motor 50 is transmitted to the transfer members 71 via the worm 51 and the worm wheel 81, and therefore, the transfer members 71 are moved to the rotation direction of the disk 10, the wedge member 60 advances to the disk 10 while the rear of the wedge member 60 is guided by the front of the guide member 70, with the result that the movable frictional pad 20a mounted at the wedge member 60 presses against the one side of the disk 10, thereby generating a braking force by the friction between the movable frictional pad 20a and the disk 10. Also, the caliper housing 30 retracts in the direction reverse to the direction in which the wedge member 60 advances, by a reaction force generated when the movable frictional pad 20a presses against the disk 10, and therefore, the stationary frictional pad 20b mounted at the caliper housing 30 presses the other side of the disk 10, thereby generating a braking force by the friction between the stationary frictional pad 20b and the disk 10.

Also, the wedge member 60 is more strongly fitted between the front of the guide member 70 and one side of the disk 10 by the frictional force acting between the movable frictional pad 20a and the disk 10 while the movable frictional pad 20a presses against one side of the disk 10. Consequently, it is possible to obtain a relatively large braking force using a relatively small power.

In this embodiment, the rear of the wedge member 60 is inclined forward such that opposite sides of the rear of the wedge member 60 are symmetrical to each other about the middle of the rear of the wedge member 60, whereby opposite side ends of the wedge member 60 are formed in the shape of a wedge. The front of the guide member 70 is formed such that the middle of the front of the guide member 70 is depressed rearward, and opposite sides of the front of the guide member 70 are inclined corresponding to the rear of the wedge member 60. Consequently, the wedge member 60 and the guide member 70 are applied equally to left and right wheels of the vehicle.

A braking releasing process is carried out in an order reverse to the braking process. Specifically, when the rotary shaft of the drive motor 50 rotates in the reverse direction, the transfer members 71 perform a rectilinear movement in parallel to an axis of the spindle 82 to return to their original positions. As a result, the wedge member 60 is guided by the transfer members 71. Consequently, the movable frictional pad 20a is separated from the disk 10, whereby the braking is released.

At the time of braking, meanwhile, the frictional pads 20a and 20b are worn, and therefore, the thicknesses of the frictional pads 20a and 20b gradually decrease, with the result that the braking force and braking responsibility gradually reduce. According to the present invention, the disk brake further includes a gap adjuster 90 to appropriately adjust a gap between the frictional pads 20a and 20b and the disk 10 based upon the wear of the frictional pads 20a and 20b.

The gap adjuster 90 includes a sensing unit to sense the advance of the wedge member 60, at which the movable frictional pad 20a is mounted, to the disk 10 by more than a critical value due to the wear of the movable frictional pad 20a and a moving unit to advance the guide member 70 to the disk 10 to compensate for the gap increased by the wear of the movable frictional pad 20a.

In this embodiment, the sensing unit includes a push rod 91 configured to be pushed along with the wedge member 60, while the push rod 91 is in contact with one of the guides 61, if the movement distance to the disk 10 exceeds the critical value when the wedge member 60 performs a slant movement during the braking.

The push rod 91 is constructed such that one end of the push rod 91 comes into contact with one of the guides 61, when the wedge member 60 advances more than the critical value, and the other end of the push rod 91 engages with a gear 92.

The gear 92 is coupled to a connection shaft 93 such that the gear 92 rotates along with the connection shaft 93. The connection shaft 93 is configured in the form of a spindle having a screw formed thereon.

Also, a nut 32 is fitted on the screw of the connection shaft 93 to perform a forward-and-backward rectilinear movement upon the rotation of the connection shaft 93. The nut 32 may be coupled to the carrier 30 or integrated with the carrier 30 such that the guide member 70 can be transferred to the disk 10.

Consequently, when the push rod 91 is pushed to one side, by the slant movement of the wedge member 60, to rotate the gear 92 engaging with the push rod 91, the connection shaft 93 is rotated, with the result that the nut 32 advances to the disk 10, and therefore, the power converter, including the guide member 70, is moved to maintain an appropriate gap between the frictional pad 20a and the disk 10, thereby compensating for the increase of the gap due to the wear of the frictional pad 20a.

Figure 3:
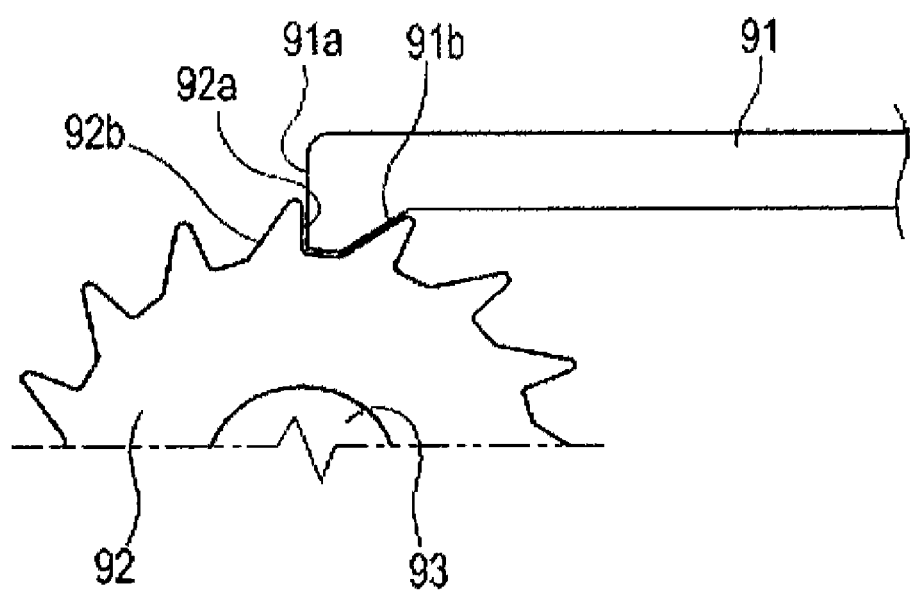
FIG. 3 is a schematic view illustrating the braking operation of the disk brake of FIG. 2.

FIG. 3 illustrates the rotation of the gear 92 by the push rod 91. Teeth formed at the gear 92 are constructed in a structure in which one surface of each tooth is a vertical surface 92a parallel to the radial direction of the gear 92 and the other surface of each tooth is an inclined surface 92b inclined to the radial direction of the gear 92. Also, the corresponding end of the push rod 91 has a vertical surface 91a and an inclined surface 91b corresponding to the vertical surface 92a and the inclined surface 92b of the gear 92. Consequently, when the push rod 91 is pushed by the corresponding guide 61, the vertical surfaces 91a and 92a engage with each other, and therefore, the gear 92 is rotated. As a result, the gear 92 is rotated step by step according to the teeth of the gear 92.

Meanwhile, the push rod 91 is elastically supported by an additional elastic member (not shown), by which the push rod 91 returns to its original position when the braking is released. Consequently, when the braking is released, the gear 92 is stopped in a state in which the gear 92 has been rotated, and the inclined surfaces 91b and 92b of the push rod 91 and the gear 92 slide relative to each other, with the result that the push rod 91 returns to its original position. In order to prevent the rotation of the gear 92, an elastic member (not shown) may be provided to elastically support the gear 92 and the connection shaft 93 in the direction reverse to the rotation direction by the operation of the push rod 91.

Although a few embodiments of the present invention have been shown and described, it would be appreciated by those skilled in the art that changes may be made in this embodiment without departing from the principles and spirit of the invention, the scope of which is defined in the claims and their equivalents.

As apparent from the above description, the disk brake according to the present invention is characterized in that the disk brake includes a gap adjuster to sense a gap between the frictional pad and the disk based upon the wear of the frictional pad and compensate for the gap.

Consequently, the present invention has the effect of uniformly maintaining the gap between the frictional pad and the disk, even when the wear of the frictional pad is in progress, thereby uniformly maintaining a braking force and braking responsibility.

What is claimed is:

1. A disk brake for vehicles, comprising: a disk rotatable along with each wheel of a vehicle; a movable frictional pad configured to press against one side of the disk to generate a braking force; a wedge member having the movable frictional pad attached to one side thereof, the wedge member being movable to the rotation direction of the disk by a drive motor to generate a power such that the wedge member advances to the disk; and a guide member to guide the wedge member such that the wedge member advances to the disk, wherein the disk brake further comprises:

a gap adjuster to uniformly maintain a gap between the movable frictional pad and the disk, wherein the gap adjuster includes a sensing unit to sense the advance of the wedge member by more than a predetermined distance from the guide member, at the time of braking, due to the wear of the movable frictional pad, and a moving unit to move the guide member to the disk based on the sensing result of the sensing unit, the sensing unit includes a push rod configured to be pushed by the wedge member such that the push rod performs a rectilinear movement, and the moving unit includes a gear configured to rotate while engaging with one end of the push rod, a screwed connection shaft connected to the gear, and a nut fitted on the screw of the connection shaft to perform an advance and retreat movement.

2. The disk brake according to claim 1, wherein the gap adjuster is mechanically triggered.

3. The disk brake according to claim 1, wherein the gap adjuster is driven by said drive motor.

* * * * *